(12) United States Patent
Marriott et al.

(10) Patent No.: US 10,086,795 B2
(45) Date of Patent: Oct. 2, 2018

(54) LOAD INDICATORS FOR PERSONAL RESTRAINT SYSTEMS AND ASSOCIATED SYSTEMS AND METHODS

(71) Applicant: Shield Restraint Systems, Inc., Elkhart, IN (US)

(72) Inventors: Brandon S. Marriott, Goshen, IN (US); David D. Merrick, Rochester, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 0 days.

(21) Appl. No.: 15/284,184

(22) Filed: Oct. 3, 2016

(65) Prior Publication Data
US 2017/0106833 A1   Apr. 20, 2017

Related U.S. Application Data

(60) Provisional application No. 62/236,792, filed on Oct. 2, 2015.

(51) Int. Cl.
*B60R 22/48* (2006.01)
*A44B 11/25* (2006.01)

(52) U.S. Cl.
CPC .......... *B60R 22/48* (2013.01); *A44B 11/2503* (2013.01); *A44B 11/2569* (2013.01); *B60R 2022/4866* (2013.01)

(58) Field of Classification Search
CPC .................................................. B60R 22/48
See application file for complete search history.

(56) References Cited

U.S. PATENT DOCUMENTS

| 906,045 A | 12/1908 | Martin |
|---|---|---|
| 1,079,080 A | 11/1913 | Ward |

(Continued)

FOREIGN PATENT DOCUMENTS

| CA | 2036493 A1 | 8/1991 |
|---|---|---|
| CA | 2038505 A1 | 9/1991 |

(Continued)

OTHER PUBLICATIONS

BRITAX, "COMPAQ: Convertible Car Seats," Buckle Image, accessed Oct. 12, 2010, www.britax.com.au/car-seats/compaq, 2 pages. This has been publicly available for at least one year prior to this application's filling date.

(Continued)

*Primary Examiner* — Kabir A Timory
(74) *Attorney, Agent, or Firm* — Perkins Coie LLP

(57) ABSTRACT

Buckle assemblies having load indicating features and associated systems and methods are disclosed herein. In one embodiment, a buckle assembly includes a tang having an opening that receives a web to secure the buckle assembly to a vehicle or a seat structure. The tang also includes an elongate aperture and one or more deformable protrusions along the edge of the aperture. The tang is operably coupled to a buckle frame via a coupling member that extends through the aperture. Upon the application of a sufficient load to the tang, the coupling member deforms the protrusion(s), allowing the tang to move relative to the frame. Movement of the tang relative to the frame can move a colored load indicating region to a position that is visible through a window in a housing of the buckle assembly.

21 Claims, 9 Drawing Sheets

(56) References Cited

U.S. PATENT DOCUMENTS

| | | |
|---|---|---|
| 1,369,456 A | 2/1921 | Meredith |
| 1,438,898 A | 12/1922 | Carpmill |
| 1,816,262 A | 7/1931 | Ritter |
| 1,930,378 A | 10/1933 | Beagan |
| 2,132,556 A | 10/1938 | Blackshaw |
| 2,255,258 A | 9/1941 | Lethern et al. |
| 2,372,557 A | 3/1945 | Dowd |
| 2,393,178 A | 1/1946 | Manson |
| 2,437,585 A | 3/1948 | Zimmern |
| 2,482,693 A | 9/1949 | Rogers et al. |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,668,997 A | 2/1954 | Irvin et al. |
| 2,710,999 A | 6/1955 | Davis |
| 2,763,451 A | 9/1956 | Moran |
| 2,803,864 A | 8/1957 | Bishaf |
| 2,845,233 A | 7/1958 | Pfankuch et al. |
| 2,846,745 A | 8/1958 | Lathrop |
| 2,869,200 A | 1/1959 | Phillips et al. |
| 2,876,516 A | 3/1959 | Cummings |
| 2,892,232 A | 6/1959 | Quilter |
| 2,893,088 A | 7/1959 | Harper et al. |
| 2,899,732 A | 8/1959 | Cushman |
| 2,901,794 A | 9/1959 | Prete, Jr. |
| 2,921,353 A | 1/1960 | Cushman |
| 2,938,254 A | 5/1960 | Gaylord |
| D188,897 S | 9/1960 | Prete, Jr. |
| 2,964,815 A | 12/1960 | Sereno |
| 2,965,942 A | 12/1960 | Carter |
| 3,029,487 A | 4/1962 | Shinichro |
| 3,034,596 A | 5/1962 | Twaits, Jr. |
| 3,084,411 A | 4/1963 | Lindblad |
| 3,091,010 A | 5/1963 | Davis |
| 3,104,440 A | 9/1963 | Davis |
| 3,110,071 A | 11/1963 | Higuchi |
| 3,118,208 A | 1/1964 | Wexler |
| 3,132,399 A | 5/1964 | Cooper |
| 3,137,907 A | 6/1964 | Unai |
| D198,566 S | 7/1964 | Holmberg |
| 3,142,103 A | 7/1964 | Lindblad |
| 3,142,968 A | 8/1964 | Basham et al. |
| 3,145,442 A | 8/1964 | Brown |
| 3,165,805 A | 1/1965 | Lower |
| 3,178,226 A | 4/1965 | Cates |
| 3,179,992 A | 4/1965 | Murphy, Sr. |
| 3,183,568 A | 5/1965 | Gaylord |
| 3,189,963 A | 6/1965 | Warner et al. |
| 3,218,685 A | 11/1965 | Atumi |
| 3,226,791 A | 1/1966 | Carter |
| 3,233,941 A | 2/1966 | Selzer |
| 3,256,576 A | 6/1966 | Klove, Jr. et al. |
| 3,262,169 A | 7/1966 | Jantzen |
| 3,287,062 A | 11/1966 | Board et al. |
| 3,289,261 A | 12/1966 | Davis |
| 3,293,713 A | 12/1966 | Gaylord |
| 3,306,662 A | 2/1967 | Finnigan |
| 3,312,502 A | 4/1967 | Coe |
| 3,323,829 A | 6/1967 | Liem |
| 3,369,842 A | 2/1968 | Adams et al. |
| 3,380,776 A | 4/1968 | Dillender |
| 3,414,947 A | 12/1968 | Holmberg et al. |
| 3,428,029 A | 2/1969 | Klickstein et al. |
| 3,451,720 A | 6/1969 | Makinen |
| 3,456,981 A | 7/1969 | Radke et al. |
| 3,473,201 A | 10/1969 | Hopka et al. |
| 3,491,414 A | 1/1970 | Stoffel |
| 3,505,711 A | 4/1970 | Carter |
| 3,523,342 A | 8/1970 | Spires |
| D218,589 S | 9/1970 | Lohr |
| 3,564,672 A | 2/1971 | McIntyre |
| 3,576,056 A | 4/1971 | Barcus |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,658,281 A | 4/1972 | Gaylord |
| 3,673,645 A | 7/1972 | Burleigh |
| 3,678,542 A | 7/1972 | Prete, Jr. |
| 3,695,696 A | 10/1972 | Lohr et al. |
| 3,714,684 A | 2/1973 | Gley |
| 3,744,102 A | 7/1973 | Gaylord |
| 3,744,103 A | 7/1973 | Gaylord |
| 3,747,167 A | 7/1973 | Pravaz |
| 3,760,464 A | 9/1973 | Higuchi |
| 3,766,611 A | 10/1973 | Gaylord |
| 3,766,612 A | 10/1973 | Hattori |
| 3,775,813 A | 12/1973 | Higuchi |
| 3,825,979 A | 7/1974 | Jakob |
| 3,827,716 A | 8/1974 | Vaughn et al. |
| 3,856,351 A | 12/1974 | Garvey |
| 3,879,810 A | 4/1975 | Prete, Jr. et al. |
| 3,898,715 A | 8/1975 | Balder |
| 3,935,618 A | 2/1976 | Fohl |
| 3,964,138 A | 6/1976 | Gaylord |
| 3,975,800 A | 8/1976 | Farlind |
| 3,986,234 A | 10/1976 | Frost et al. |
| 3,995,885 A | 12/1976 | Plesniarski |
| 4,018,399 A | 4/1977 | Rex |
| 4,026,245 A | 5/1977 | Arthur |
| 4,051,743 A | 10/1977 | Gaylord |
| 4,111,459 A | 5/1978 | Magyar |
| 4,095,313 A | 6/1978 | Piljay et al. |
| D248,618 S | 7/1978 | Anthony |
| 4,100,657 A | 7/1978 | Minolla |
| 4,118,833 A | 10/1978 | Knox et al. |
| 4,128,924 A | 12/1978 | Happel et al. |
| 4,136,422 A | 1/1979 | Ivanov et al. |
| 4,148,224 A | 4/1979 | Craig |
| 4,181,832 A | 1/1980 | Ueda |
| 4,184,234 A | 1/1980 | Anthony et al. |
| 4,185,363 A | 1/1980 | David |
| 4,196,500 A | 4/1980 | Happel et al. |
| 4,220,294 A | 9/1980 | DiPaola |
| 4,228,567 A | 10/1980 | Ikesue et al. |
| 4,239,260 A | 12/1980 | Hollowell |
| 4,253,623 A | 3/1981 | Steger et al. |
| 4,262,396 A | 4/1981 | Koike |
| 4,273,301 A | 6/1981 | Frankila |
| 4,278,043 A | 7/1981 | Heath |
| 4,302,049 A | 11/1981 | Simpson |
| 4,317,263 A | 3/1982 | Fohl |
| 4,321,734 A | 3/1982 | Gandelman |
| 4,323,204 A | 4/1982 | Takada |
| 4,334,341 A | 6/1982 | Krautz et al. |
| 4,336,636 A | 6/1982 | Ishiguro et al. |
| 4,344,588 A | 8/1982 | Hollowell et al. |
| 4,366,604 A | 1/1983 | Anthony et al. |
| 4,385,425 A | 5/1983 | Tanaka et al. |
| 4,403,376 A | 9/1983 | Palloks |
| 4,408,374 A | 10/1983 | Fohl |
| 4,419,874 A | 12/1983 | Brentini |
| 4,425,688 A | 1/1984 | Anthony et al. |
| 4,428,103 A | 1/1984 | Wier et al. |
| 4,454,634 A | 6/1984 | Haglund et al. |
| D274,861 S | 7/1984 | Lindblad |
| 4,457,052 A | 7/1984 | Hauber |
| 4,457,251 A * | 7/1984 | Weman ............... A44B 11/2561 116/203 |
| 4,487,454 A | 12/1984 | Biller |
| 4,491,343 A | 1/1985 | Fohl |
| 4,525,901 A | 7/1985 | Krauss |
| 4,545,097 A | 10/1985 | Wier |
| 4,549,769 A | 10/1985 | Pilarski |
| 4,555,831 A | 12/1985 | Otzen et al. |
| 4,562,625 A | 1/1986 | Hunter, Jr. et al. |
| 4,569,535 A | 2/1986 | Haglund et al. |
| 4,574,911 A | 3/1986 | North et al. |
| 4,587,696 A * | 5/1986 | Ueda ............... A44B 11/2511 200/61.58 R |

(56) References Cited

U.S. PATENT DOCUMENTS

| | | |
|---|---|---|
| D285,383 S | 9/1986 | Anthony |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hakansson |
| 4,644,618 A | 2/1987 | Holmberg et al. |
| 4,646,400 A | 3/1987 | Tanaka |
| 4,648,483 A | 3/1987 | Skyba |
| 4,650,214 A | 3/1987 | Higbee |
| 4,651,946 A | 3/1987 | Anthony et al. |
| 4,656,700 A | 4/1987 | Tanaka et al. |
| 4,660,889 A | 4/1987 | Anthony et al. |
| 4,679,852 A | 7/1987 | Anthony et al. |
| 4,682,791 A | 7/1987 | Ernst |
| 4,685,176 A | 8/1987 | Burnside |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,726,625 A | 2/1988 | Bougher |
| 4,727,628 A | 3/1988 | Rudholm |
| 4,733,444 A | 3/1988 | Takada |
| 4,738,485 A | 4/1988 | Rumpf |
| 4,741,574 A | 5/1988 | Weightman et al. |
| 4,742,604 A | 5/1988 | Mazelsky |
| D296,678 S | 7/1988 | Lortz et al. |
| 4,757,579 A | 7/1988 | Nishino et al. |
| 4,758,048 A | 7/1988 | Shuman |
| 4,766,654 A | 8/1988 | Sugimoto |
| 4,786,078 A | 11/1988 | Schreier et al. |
| 4,786,080 A | 11/1988 | Jay |
| 4,790,597 A | 12/1988 | Bauer et al. |
| 4,809,409 A | 3/1989 | Van Riesen |
| 4,832,410 A | 5/1989 | Bougher |
| 4,843,688 A | 7/1989 | Ikeda |
| 4,854,607 A | 8/1989 | Mandracchia et al. |
| 4,854,608 A | 8/1989 | Barral |
| D303,232 S | 9/1989 | Lortz et al. |
| 4,876,770 A | 10/1989 | Bougher |
| 4,876,772 A | 10/1989 | Anthony et al. |
| 4,884,652 A | 12/1989 | Vollmer |
| 4,901,407 A | 2/1990 | Pandola et al. |
| 4,903,377 A | 2/1990 | Doty |
| 4,911,377 A | 3/1990 | Lortz et al. |
| 4,919,484 A | 4/1990 | Bougher et al. |
| 4,927,211 A | 5/1990 | Bolcerek |
| 4,934,030 A | 6/1990 | Spinosa et al. |
| 4,940,254 A | 7/1990 | Ueno |
| 4,942,649 A | 7/1990 | Anthony et al. |
| 4,995,640 A | 2/1991 | Saito |
| 5,015,010 A | 5/1991 | Homeier et al. |
| 5,023,981 A | 6/1991 | Anthony et al. |
| 5,026,093 A | 6/1991 | Nishikaji |
| 5,029,369 A | 7/1991 | Oberhardt et al. |
| 5,031,962 A | 7/1991 | Lee |
| 5,038,446 A | 8/1991 | Anthony et al. |
| 5,039,169 A | 8/1991 | Bougher et al. |
| 5,046,687 A | 9/1991 | Herndon |
| 5,050,274 A | 9/1991 | Staniszewski et al. |
| 5,054,815 A | 10/1991 | Gavagan |
| 5,058,244 A | 10/1991 | Fernandez |
| 5,067,212 A | 11/1991 | Ellis |
| 5,074,011 A | 12/1991 | Carlson |
| 5,074,588 A | 12/1991 | Huspen |
| 5,084,946 A | 2/1992 | Lee |
| 5,088,160 A | 2/1992 | Warrick |
| 5,088,163 A | 2/1992 | van Riesen |
| 5,097,572 A | 3/1992 | Warrick |
| 5,100,176 A | 3/1992 | Ball et al. |
| D327,455 S | 6/1992 | Blair |
| 5,119,532 A | 6/1992 | Tanaka |
| 5,123,147 A | 6/1992 | Blair |
| 5,123,673 A | 6/1992 | Tame |
| 5,142,748 A | 9/1992 | Anthony et al. |
| 5,159,732 A | 11/1992 | Burke |
| 5,160,186 A | 11/1992 | Lee |
| 5,165,149 A | 11/1992 | Nihei |
| 5,170,539 A | 12/1992 | Lundstedt et al. |
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| 1,338,119 A | 8/1993 | Merrick |
| 5,234,181 A | 8/1993 | Schroth |
| 5,236,220 A | 8/1993 | Mills |
| 5,248,187 A | 9/1993 | Harrison |
| D342,465 S | 12/1993 | Anthony et al. |
| 5,267,377 A | 12/1993 | Gillis et al. |
| 5,269,051 A | 12/1993 | McFalls |
| 5,272,770 A | 12/1993 | Allen et al. |
| 5,282,672 A | 2/1994 | Borlinghaus |
| 5,282,706 A | 2/1994 | Anthony et al. |
| 5,283,933 A | 2/1994 | Wiseman et al. |
| 5,286,057 A | 2/1994 | Forster |
| 5,286,090 A | 2/1994 | Templin et al. |
| 5,292,181 A | 3/1994 | Dybro |
| 5,301,371 A | 4/1994 | Chao |
| 5,306,044 A | 4/1994 | Tucker |
| 5,308,148 A | 5/1994 | Peterson et al. |
| 5,311,653 A | 5/1994 | Merrick |
| 5,332,968 A | 7/1994 | Brown |
| 5,350,195 A | 9/1994 | Brown |
| 5,350,196 A | 9/1994 | Atkns |
| 5,364,048 A | 11/1994 | Fujimura et al. |
| 5,369,855 A | 12/1994 | Tokugawa |
| 5,370,333 A | 12/1994 | Lortz et al. |
| 5,375,879 A | 12/1994 | Williams et al. |
| 5,380,066 A | 1/1995 | Wiseman et al. |
| 5,392,535 A | 2/1995 | Van Noy et al. |
| 5,397,171 A | 3/1995 | Leach |
| 5,403,038 A | 4/1995 | McFalls |
| 5,406,681 A | 4/1995 | Olson |
| 5,411,292 A | 5/1995 | Collins et al. |
| 5,416,957 A | 5/1995 | Renzi, Sr. et al. |
| D359,710 S | 6/1995 | Chinni et al. |
| 5,432,987 A | 7/1995 | Schroth |
| 5,435,272 A | 7/1995 | Epstein |
| 5,443,302 A | 8/1995 | Dybro |
| D362,415 S | 9/1995 | Takimoto |
| 5,451,094 A | 9/1995 | Templin et al. |
| D364,124 S | 11/1995 | Lortz et al. |
| 5,471,714 A | 12/1995 | Olson |
| 5,495,646 A | 3/1996 | Scrutchfield et al. |
| 5,497,956 A | 3/1996 | Crook |
| 5,511,856 A | 4/1996 | Merrick et al. |
| 5,516,199 A | 5/1996 | Crook et al. |
| 5,526,556 A | 6/1996 | Czank |
| 5,540,403 A | 7/1996 | Standley |
| 5,560,565 A | 10/1996 | Merrick et al. |
| 5,561,891 A | 10/1996 | Hsieh |
| 5,566,431 A | 10/1996 | Haglund |
| 5,568,676 A | 10/1996 | Freeman |
| 5,570,933 A | 11/1996 | Rouhana et al. |
| 5,577,683 A | 11/1996 | Imai |
| 5,579,785 A | 12/1996 | Bell |
| 5,584,107 A | 12/1996 | Koyanagi et al. |
| 5,588,189 A | 12/1996 | Gorman et al. |
| 5,606,783 A | 3/1997 | Gillis et al. |
| 5,622,327 A | 4/1997 | Heath et al. |
| 5,628,548 A | 5/1997 | Lacoste |
| 5,634,664 A | 6/1997 | Seki et al. |
| 5,640,468 A | 6/1997 | Hsu |
| 5,669,572 A | 9/1997 | Crook |
| 5,695,243 A | 12/1997 | Anthony et al. |
| 5,699,594 A | 12/1997 | Czank et al. |
| D389,426 S | 1/1998 | Merrick et al. |
| 5,722,689 A | 3/1998 | Chen et al. |
| 5,743,597 A | 4/1998 | Jessup et al. |
| 5,765,774 A | 6/1998 | Maekawa et al. |
| 5,774,947 A | 7/1998 | Anscher |
| 5,779,319 A | 7/1998 | Merrick |
| 5,788,281 A | 8/1998 | Yanagi et al. |

(56) References Cited

U.S. PATENT DOCUMENTS

| | | |
|---|---|---|
| 5,788,282 A | 8/1998 | Lewis |
| 5,878,469 A | 3/1999 | Wier |
| D748,529 S | 2/2016 | Paik et al. |
| 2002/0089163 A1 | 7/2002 | Bedewi et al. |
| 2002/0135175 A1 | 9/2002 | Schroth |
| 2002/0145279 A1 | 10/2002 | Murray |
| 2003/0015863 A1 | 1/2003 | Brown et al. |
| 2003/0027917 A1 | 2/2003 | Namiki et al. |
| 2003/0085608 A1 | 5/2003 | Girardin |
| 2004/0066291 A1* | 4/2004 | Tracy .............. B60N 2/2812 340/457.1 |
| 2004/0034953 A1 | 5/2004 | Hansen |
| 2004/0169411 A1 | 9/2004 | Murray |
| 2004/0174063 A1 | 9/2004 | Kocher |
| 2004/0217583 A1 | 11/2004 | Wang |
| 2004/0227390 A1 | 11/2004 | Schroth |
| 2004/0251367 A1 | 12/2004 | Suzuki et al. |
| 2005/0073187 A1 | 4/2005 | Frank et al. |
| 2005/0107932 A1 | 5/2005 | Bolz et al. |
| 2005/0127660 A1 | 6/2005 | Liu |
| 2005/0175253 A1 | 8/2005 | Li et al. |
| 2005/0179244 A1 | 8/2005 | Schroth |
| 2005/0206151 A1 | 9/2005 | Ashline |
| 2005/0284977 A1 | 12/2005 | Specht et al. |
| 2006/0071535 A1 | 4/2006 | Kim et al. |
| 2006/0075609 A1 | 4/2006 | Dingman et al. |
| 2006/0090313 A1 | 5/2006 | Muromachi et al. |
| 2006/0097095 A1 | 5/2006 | Boast |
| 2006/0237573 A1 | 10/2006 | Boelstler et al. |
| 2006/0243070 A1 | 11/2006 | Van Druff et al. |
| 2006/0267394 A1 | 11/2006 | David et al. |
| 2006/0277727 A1 | 12/2006 | Keene et al. |
| 2007/0052255 A1 | 3/2007 | O'Connor |
| 2007/0080528 A1 | 4/2007 | Itoga et al. |
| 2007/0241549 A1 | 10/2007 | Boelstler et al. |
| 2007/0257480 A1 | 11/2007 | Van Druff et al. |
| 2008/0018156 A1 | 1/2008 | Hammarskjold et al. |
| 2008/0030013 A1 | 2/2008 | Burghardt |
| 2008/0054615 A1 | 3/2008 | Coultrup |
| 2008/0087754 A1 | 4/2008 | Aihara et al. |
| 2008/0093833 A1 | 4/2008 | Odate |
| 2008/0100051 A1 | 5/2008 | Bell et al. |
| 2008/0100122 A1 | 5/2008 | Bell et al. |
| 2008/0136246 A1 | 6/2008 | Salter |
| 2008/0172847 A1 | 7/2008 | Keene et al. |
| 2008/0224460 A1 | 9/2008 | Erez |
| 2009/0014991 A1 | 1/2009 | Smyth et al. |
| 2009/0069983 A1 | 3/2009 | Humbert et al. |
| 2009/0179412 A1 | 7/2009 | Gray et al. |
| 2009/0183348 A1 | 7/2009 | Walton et al. |
| 2009/0212549 A1 | 8/2009 | Jones |
| 2009/0241305 A1 | 10/2009 | Buckingham |
| 2010/0046843 A1 | 2/2010 | Ma et al. |
| 2010/0115737 A1 | 5/2010 | Foubert |
| 2010/0125983 A1 | 5/2010 | Keene et al. |
| 2010/0146749 A1 | 6/2010 | Jung |
| 2010/0213753 A1 | 8/2010 | Humbert |
| 2010/0219667 A1 | 9/2010 | Merrill et al. |
| 2011/0010901 A1 | 1/2011 | Holler |
| 2011/0043402 A1 | 2/2011 | Sasakawa |
| 2011/0057500 A1 | 3/2011 | Walker et al. |
| 2011/0162175 A1 | 7/2011 | Gnesda et al. |
| 2012/0242134 A1 | 9/2012 | Siegel |
| 2012/0284966 A1 | 11/2012 | Greaves et al. |
| 2012/0292893 A1 | 11/2012 | Baca et al. |
| 2013/0127229 A1 | 5/2013 | Humbert |
| 2013/0207442 A1 | 8/2013 | Sickon et al. |
| 2013/0212845 A1 | 8/2013 | Ford et al. |
| 2014/0230202 A1 | 8/2014 | Humbert et al. |
| 2016/0318472 A1 | 11/2016 | Schramm |

FOREIGN PATENT DOCUMENTS

| | | |
|---|---|---|
| CA | 2091526 A1 | 10/1993 |
| CA | 2112960 C | 12/2002 |
| CA | 2450744 A1 | 2/2003 |
| DE | 4019402 A1 | 12/1991 |
| DE | 69019765 T2 | 7/1995 |
| DE | 4421688 C1 | 12/1995 |
| EP | 0026564 A1 | 4/1981 |
| EP | 0254383 A2 | 1/1988 |
| EP | 0363062 A2 | 4/1990 |
| EP | 0380442 A2 | 8/1990 |
| EP | 0401455 A1 | 12/1990 |
| EP | 0404730 A1 | 12/1990 |
| EP | 0449772 A1 | 10/1991 |
| EP | 0519296 A1 | 12/1992 |
| EP | 0561274 A1 | 9/1993 |
| EP | 0608564 A1 | 8/1994 |
| EP | 1153789 A2 | 11/2001 |
| EP | 1447021 A1 | 8/2004 |
| FR | 1298012 A | 7/1962 |
| GB | 888436 A | 1/1962 |
| GB | 1047761 | 11/1966 |
| GB | 1582973 A | 1/1981 |
| GB | 2055952 A | 3/1981 |
| GB | 2356890 A | 6/2001 |
| JP | 52055120 A | 5/1977 |
| JP | 63141852 A | 6/1988 |
| JP | 63247150 A | 10/1988 |
| JP | 10119611 A | 5/1998 |
| JP | 2001138858 A | 5/2001 |
| WO | 1986003386 A | 6/1986 |
| WO | 2003009717 A2 | 2/2003 |
| WO | 2004004507 A1 | 1/2004 |
| WO | 2006041859 | 4/2006 |
| WO | 2010027853 A1 | 3/2010 |

OTHER PUBLICATIONS

Global Seating Systems LLC, "CCOPS Cobra: Soldier Survival System," 1 page, undated. [Color Copy].

Holmbergs, "Art.No. 63-4959-XX and 63-4958-XX GR.1 Buckle, 3/5 point" accessed Sep. 15, 2010, www.holmbergs.se, 2 pages.

Holmbergs "Gr. 0+ 3-point buckle with plastic chassi and tongues," accessed Sep. 15, 2010, http://www.holmbergs.se/1/1.0.1.0/70/1/, 1 page.

Holmbergs, "Gr. 1 Buckle, Viking," accessed Sep. 15, 2010, http://www.holmbergs.se1/1/1.0.1.0/53/1/, 1 page.

Holmbergs, "Group 1 Systems," accessed Sep. 15, 2010, http://www.holmbergs.se/1/1.0.1.0/87/1/, 1 page.

Holmbergs, "Infant buckle with steel tongues," accessed Sep. 15, 2010, http://www.holmbergs.se/1/1.0.1.0/74/1/, 1 page.

Holmbergs, "Infant buckle. 5-point with plastic chassi and plastic tongues," accessed Sep. 15, 2010, http://www.holmbergs.se/1/1.0.1.0/73/1/, 1 page.

Sabelt, "SABUSA004: Fiberglass-plastic buckle with metal pin latch," accessed Sep. 15, 2010, http://childsafety.sabelt.com/index.php/eshop/product/Sabelt-Racing-SABUSA004.html/1/, 1 page.

Novarace, "DL: Group 1 Buckle," accessed Sep. 15, 2010, http://www.novarace.com/index.php?option=com_content&task=view&id=3684Itemid=48, 1 page.

Novarace, "GT 3: Group 0 Buckle," accessed Sep. 15, 2010, http://www.novarace.com/index.php?option=com_content&task=view&id=33&Itemid=46, 1 page.

Novarace, "GT 5: Group 0 Buckle," accessed Sep. 15, 2010, http://www.novarace.com/index.php?option=com_content&task=view&id=30&Itemid=44, 1 page.

Novarace, "GT: Group 1 Buckle," accessed Oct. 8, 2010, http://www.novarace.com/gt.htm, 1 page.

Novarace, "KMA 1: Group 1 Buckle," accessed Sep. 15, 2010 http://www.novarace.com/index.php?option=com_content&task=view&id=34&Itemid=47, 1 page.

SABELT Catalog, "SAB104: Standard tongue hole to facilitate webbing insert," p. 23, 1 page.

(56) References Cited

OTHER PUBLICATIONS

Sabelt, "Daphne 0: Fiberglass-plastic buckle with metal pin latch," accessed Sep. 15, 2010, http://childsafety.sabelt.com/index.php/eshop/product/Sabelt-Racing-DAPHNE-0.html/1/, 1 page.
Sabelt, "RO1000: Fiberglass-plastic buckle with metal pin latch," accessed Sep. 15, 2010, http://childsafety.sabelt.com/index.php/eshop/product/Sabelt-Racing_RO1000.html/1/pid/1, 1 page.
Sabelt, "SAB004: Fiberglass-plastic buckle with metal pin latch," accessed Sep. 15, 2010, http://childsafety.sabelt.com/index.php/eshop/product/Sabelt-Racing-SAB004.html/1/pid/1, 1 page.
International Search Report and Written Opinion dated Feb. 17, 2017; International Patent Application No. PCT/US2016/055186; 10 pages.

* cited by examiner

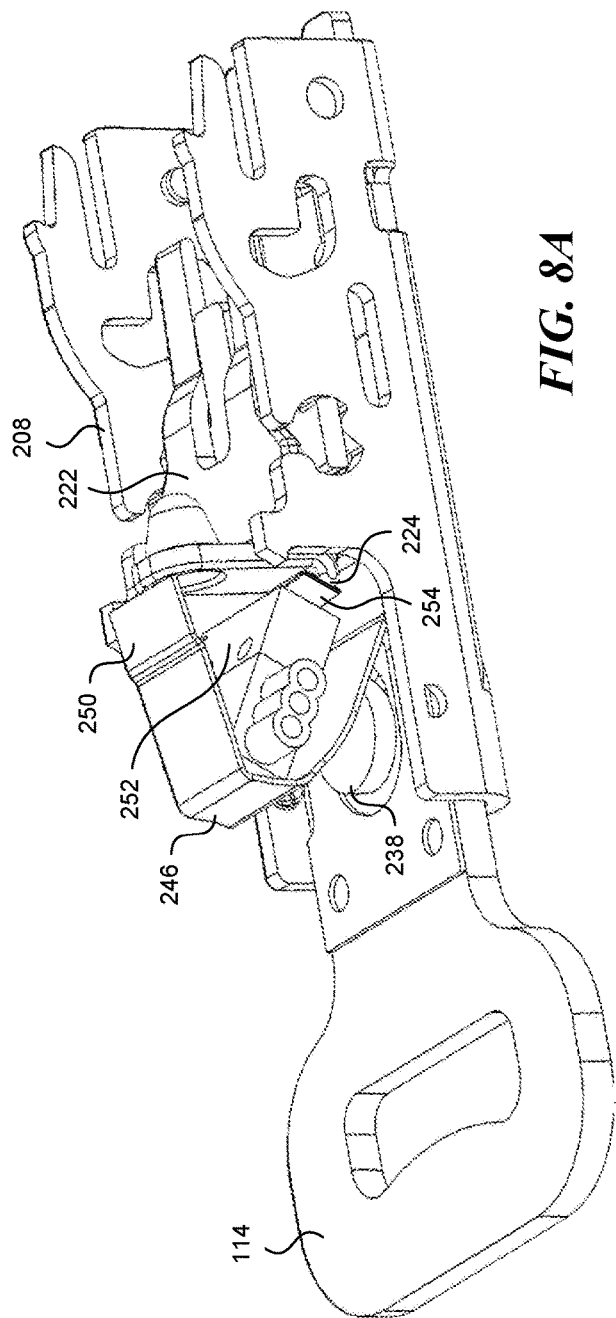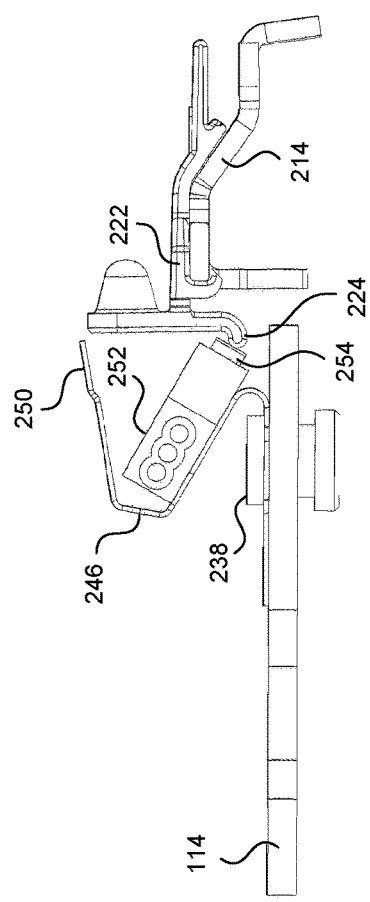
FIG. 8A
FIG. 8B

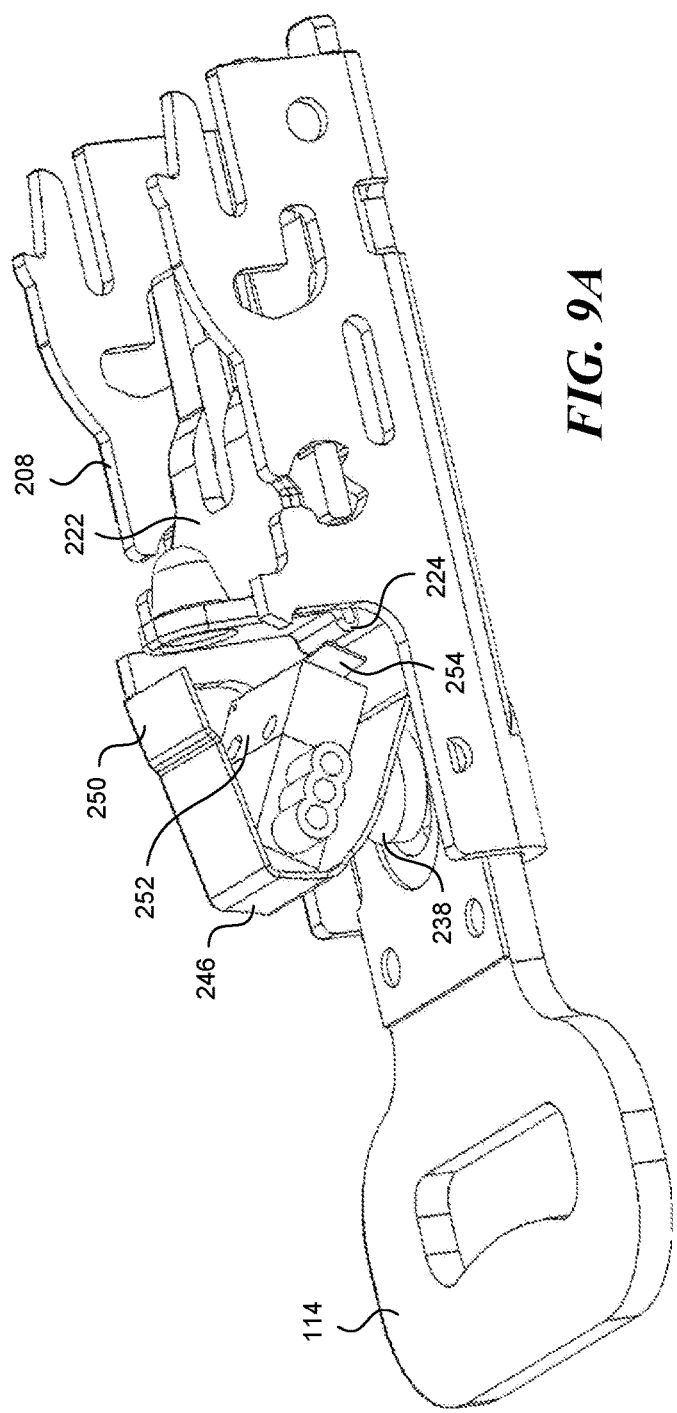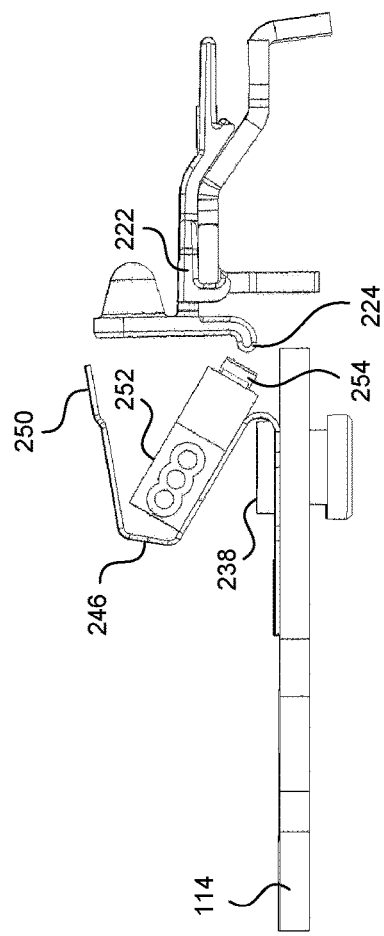
FIG. 9A
FIG. 9B

LOAD INDICATORS FOR PERSONAL RESTRAINT SYSTEMS AND ASSOCIATED SYSTEMS AND METHODS

CROSS-REFERENCE TO RELATED APPLICATION

The present application claims priority to U.S. Provisional Application No. 62/236,792, filed Oct. 2, 2015, and titled "Load Indicators for Personal Restraint Systems and Associated Systems and Methods," which is incorporated herein by reference in its entirety.

TECHNICAL FIELD

The following disclosure relates generally to load indicators for use in personal restraint systems and, more particularly, to load indicators and associated systems and methods that can provide an indication that a personal restraint system has sustained a load of a predetermined value.

BACKGROUND

A variety of vehicles include restraint systems that can restrain operators or passengers during crashes or other acceleration/deceleration events. In general, most components used in these restraint systems are relatively robust. Even so, many of these components can be damaged or otherwise compromised by crashes or other load producing events. For example, even relatively minor crashes can subject nylon webbing to loads that may reduce the webbing's performance in a subsequent crash. Additionally, although the forces generated by individual minor crashes may not be significant, the repeated application of these forces via significant numbers of individual minor crashes may damage or compromise the performance of more robust components of the restraint systems (e.g., D-rings, mounting brackets, mounting bolts, etc.).

Some types of vehicles can subject their associated restraint systems to significant forces more frequently than other types of vehicles. For example, off-road recreational utility vehicles (RUVs) are often driven in manners that subject the associated restraint systems to significant loads, including loads sustained during aggressive driving over rough terrain and loads sustained via minor crashes. These loads can damage components of the restraint systems, and a routine visual inspection may not be sufficient to determine whether a component has been compromised. Additionally, damaged or compromised components may be located in positions where they are not visible without the removal or disassembly of other components. Moreover, multi-passenger vehicles that are engaged in accidents may not be fully occupied, and the restraint systems in the unoccupied seats may be unnecessarily replaced because there is no way to determine if they were subjected to a significant load that could compromise their performance. The unnecessary replacement of restraint systems can be particularly expensive in mass-transit vehicles, charter buses, and other high capacity vehicles.

BRIEF DESCRIPTION OF THE DRAWINGS

FIGS. 8A and 8B are isometric and side views, respectively, illustrating several components of a buckle assembly prior to being subjected to a design-level load.

FIGS. 9A and 9B are isometric and side views, respectively, illustrating the buckle assembly of FIGS. 8A and 8B after being subjected to a design-level load.

DETAILED DESCRIPTION

Figure 1:
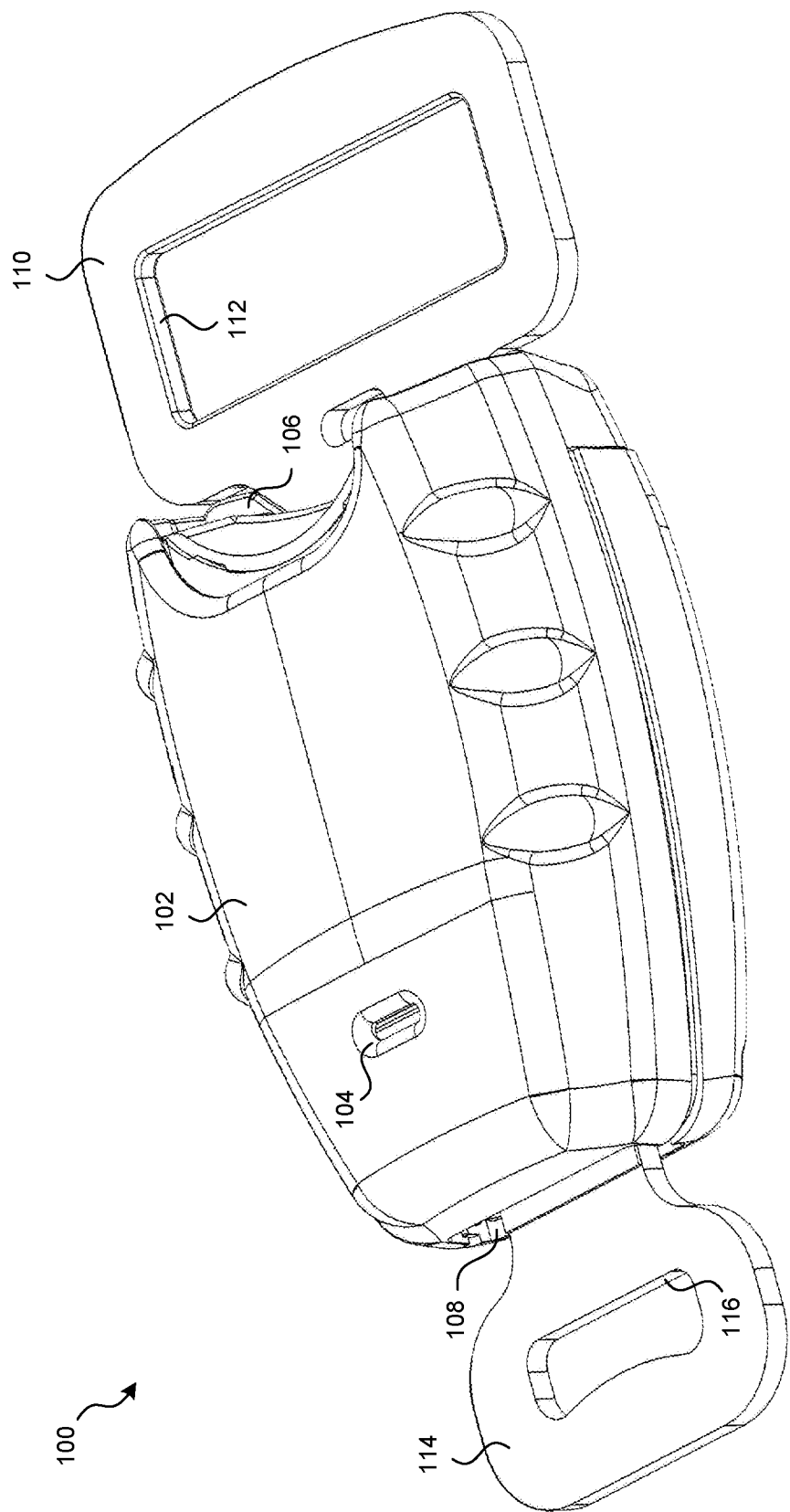
FIG. 1 is an isometric view of a buckle assembly configured in accordance with an embodiment of the present technology.

The following disclosure describes various embodiments of load indicators and associated systems and methods. In some embodiments, a buckle assembly for a personal restraint system includes a load indicator. For example, a buckle assembly configured in accordance with one embodiment of the present technology includes a tang having an opening that receives a web to secure the buckle assembly to a vehicle or seat structure. The tang is operably coupled to a buckle frame via a coupling member that extends through a deformable aperture in the tang. In this embodiment, the aperture is generally elongate, and the tang includes one or more protrusions around the edge of the aperture. Upon the application of a sufficient load to the tang, the coupling member deforms the protrusion(s), allowing the tang to move relative to the frame. In several embodiments, the buckle assembly includes a load indicator that is coupled to the tang, and a housing having a window. The load indicator includes a load indicating region, and movement of the tang moves the load indicating region from a first position away from the window to a second position adjacent the window. In the second position, the load indicating region is visible through the window. In other embodiments, the devices, systems and associated methods can have different configurations, components, and/or procedures. Still other embodiments may eliminate particular components and/or procedures. A person of ordinary skill in the relevant art, therefore, will understand that the present technology, which includes associated devices, systems, and procedures, may include other embodiments with additional elements or steps, and/or may include other embodiments without several of the features or steps shown and described below with reference to FIGS. 1 to 9B.

As discussed above, personal restraint systems can be subjected to loads that can damage or compromise various components without causing readily apparent signs of such damage. Although some devices have been developed to provide an indication of a high-load event, these devices often include complex components that are susceptible to failure when exposed to harsh conditions, or only provide an indication after a very high load, e.g., a head-on collision at 45 miles per hour. For example, many existing load indicating devices do not provide any indication of loads that may be relatively high, e.g., a head-on collision at 10 miles per hour. Single occurrences of such loads are unlikely to compromise any components, and many vehicles (including street legal automobiles), are generally not repeatedly subjected to such relatively high loads. However, other types of vehicles may subject their restraint systems to repeated applications of relatively high loads. Military vehicles and RUVs, for example, are often driven and utilized in manners that repeatedly produce relatively high loads on the restraint systems.

The present technology includes several embodiments of buckle assemblies and restraint system components that can provide an indication that an associated restraint system has experienced a load that could compromise the function and performance of the restraint system. Such a load may result from, e.g., a crash. Moreover, the embodiments disclosed herein can include load indicating components that can be tailored for specific load values. For example, buckle assembly components (including tangs and/or frames) and other restraint system components can include features that can be constructed to be deformed or crushed at a particular load value or design-level load. As used herein, the term "design-level load" refers to the load value at which the components are designed to provide the associated indication. The deformation or crushing of the features that results from the application of a design-level load can provide for relative motion between components of the restraint system, and provide an associated indication that the system has sustained a design-level load.

Certain details are set forth in the following description and FIGS. 1 to 9B to provide a thorough understanding of various embodiments of the disclosure. To avoid unnecessarily obscuring the description of the various embodiments of the disclosure, other details describing well-known structures and systems often associated with buckle assemblies, personal restraint systems, and the components or devices associated with the manufacture of buckle assemblies and personal restraint systems are not set forth below. Moreover, many of the details and features shown in the Figures are merely illustrative of particular embodiments of the disclosure. Accordingly, other embodiments can have other details and features without departing from the spirit and scope of the present disclosure. In addition, the various elements and features illustrated in the Figures may not be drawn to scale. Furthermore, various embodiments of the disclosure can include structures other than those illustrated in the Figures and are expressly not limited to the structures shown in the Figures.

FIG. 1 is an isometric view of a buckle assembly 100 configured in accordance with an embodiment of the present disclosure. In the illustrated embodiment, the buckle assembly 100 includes a housing 102 having a window 104, a first opening 106 and a second opening 108. A connector 110 having a web opening 112 can be inserted into the first opening 106 to couple the connector 110 to the buckle assembly 100. A tang 114 having a web opening 116 extends outwardly from the housing 102 through the second opening 108. The connector web opening 112 and the tang web opening 116 can each be coupled to a corresponding web or other restraint system component to secure an occupant of a vehicle in his or her seat. For example, a first portion of a lap belt (not shown) can be fastened to the connector web opening 112, and a second portion of a lap belt can be fastened to the tang web opening 116. As described in more detail below, when the vehicle experiences a crash or other event that produces a load above certain magnitude, the window 104 can display an indication that the buckle assembly 100 has been subjected to a design-level load.

Figure 2:
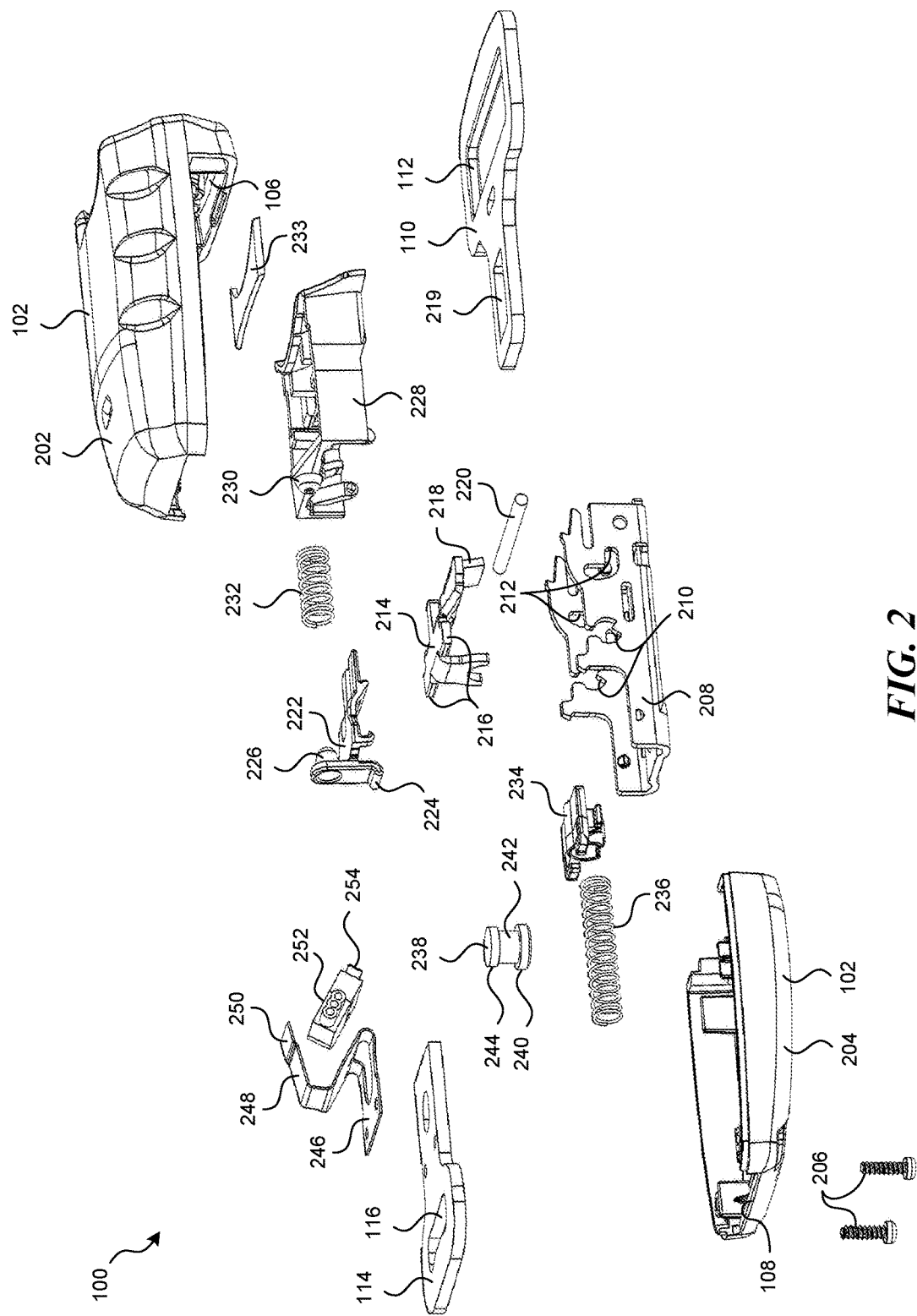
FIG. 2 is an exploded isometric view of a buckle assembly and a connector configured in accordance with an embodiment of the present technology.
Figure 3:
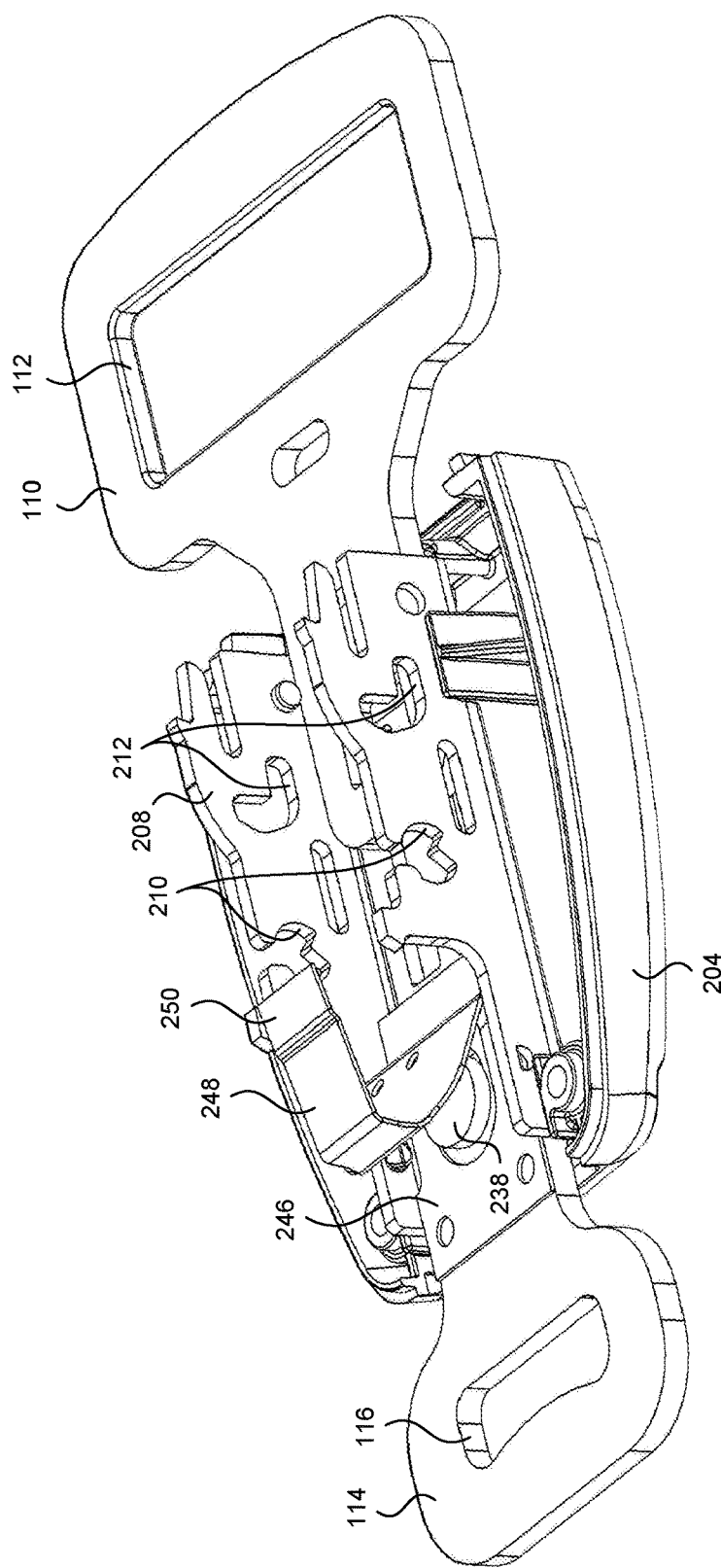
FIG. 3 is an isometric view of a connector and a portion of a buckle assembly configured in accordance with an embodiment of the present technology.

FIG. 2 is an exploded isometric view of the buckle assembly 100 and the connector 110 configured in accordance with an embodiment of the present technology. FIG. 3 is an isometric view of the connector 110 and a portion of the buckle assembly 100 configured in accordance with an embodiment of the present technology. As shown in FIG. 2, the housing 102 contains or at least partially contains several internal components of the buckle assembly 100. Several of the buckle's internal components, however, are not shown in FIG. 3 for ease of illustration.

Referring to FIGS. 2 and 3 together, the housing 102 includes an upper portion 202 and a lower portion 204. The upper portion 202 is removably secured to the lower portion 204 via a pair of fasteners (e.g., screws) 206. The buckle assembly 100 includes a frame 208 having a pair of first openings 210 and a pair of second openings 212. A pawl 214 having a pair of opposing tabs 216 and a latch 218 can be pivotally coupled to the frame 208. For example, the tabs 216 can be received in the first openings 210, and the pawl 214 can pivot about the tabs 216 to releasably position the latch 218 within a latch opening 219 in the connector 110, and thereby releasably couple the connector 110 to the buckle assembly 100. A locking pin 220 can be received in the second openings 212 and can retain the pawl 214 in the latched position.

The buckle assembly 100 also includes a pawl extension 222 that can be coupled to the pawl 214. The pawl extension 222 has a contact feature 224 and a spring mount 226. A release button 228 having a spring mount 230 can be positioned to release the connector 110 by acting on the pawl 214 via the pawl extension 222. For example, the release button 228 can be positioned to extend into the housing 102 through the first opening 106 and engage a first biasing member or first spring 232. The first spring 232 extends between the pawl extension spring mount 222 and the release button spring mount 230, biasing the release button 228 toward the first opening 106 in the housing 102. A release button insert 233 is positioned between the housing upper portion 202 and the release button 228. The release button 228 slidably straddles the frame 208, and the release button insert 233 engages slots on the frame 208 to provide a hard stop when the release button 228 is fully depressed into the first opening 106.

The release button 228 can be actuated to release the connector 110 with the assistance of an ejector 234. The ejector 234 is slidably coupled to the frame 208 and biased toward the first opening 106 by a second biasing member or second spring 236. Depressing the release button 228 releases the locking pin 220, and rotates the latch 218 out of the latch opening 219. With the latch 218 released, the second spring 236 urges the ejector 234 against the connector 110, ejecting the connector 110 from the buckle assembly 100.

The tang 114 can be coupled to the frame 208 via a coupling member 238. In the illustrated embodiment, the coupling member 238 includes a first head portion 240, a central portion 242 and a second head portion 244. As described in more detail below, the second head portion 244 can be formed via swedging that is performed after the coupling member has been inserted through apertures in the frame 208 and the tang 114. A load indicator 246 having an upper portion 248 and an indicating region 250 can be coupled to the tang 114; and a switch 252 having an actuator 254 can be coupled to the indicator 246 so that the contact feature 224 on the pawl extension 222 can contact the actuator 254 to operate the switch 252, as described further below. A majority of the upper portion 248 of the load indicator 246 can have a first color (e.g., grey), and the load indicating region 250 can have a second color (e.g., bright red).

Figure 4:
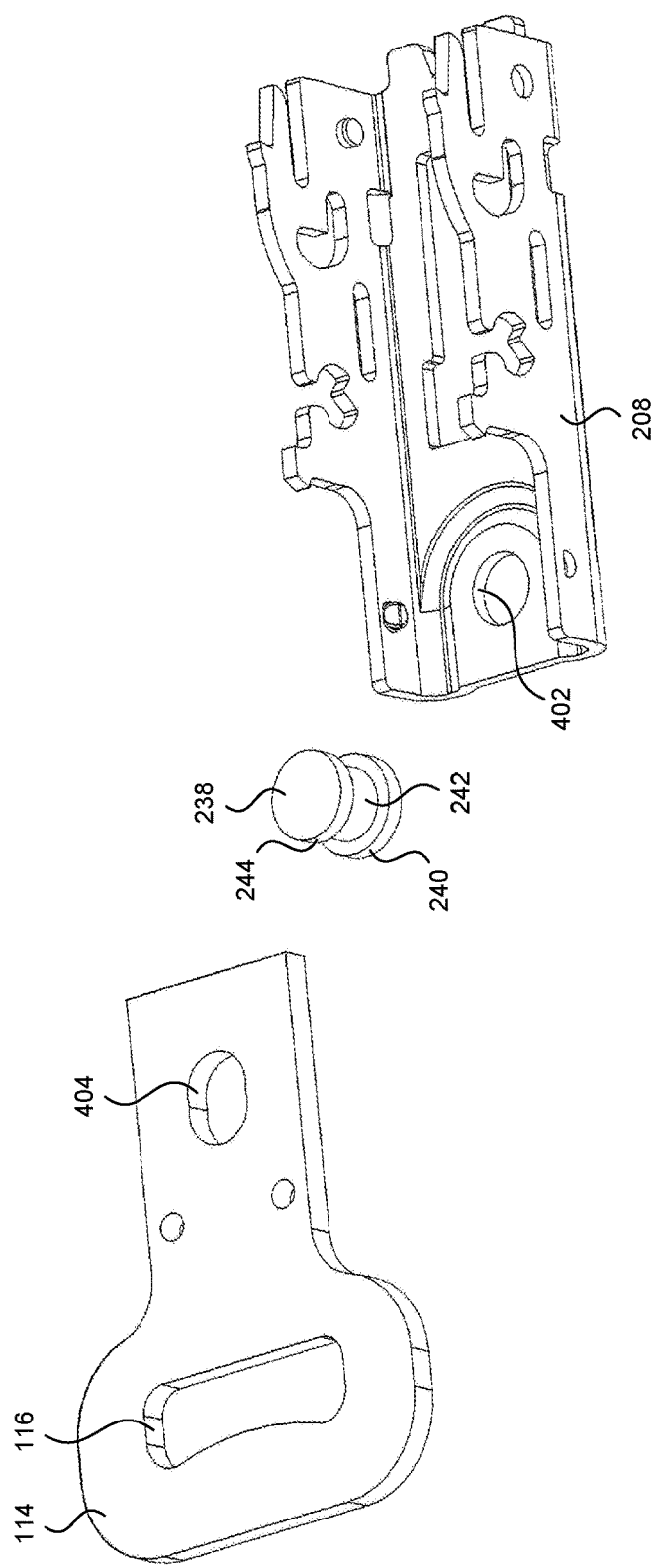
FIG. 4 is an exploded isometric view of several components of a buckle assembly configured in accordance with an embodiment of the present technology.

FIG. 4 is an exploded isometric view of the frame 208, the coupling member 238 and the tang 114 configured in accordance with an embodiment of the present technology. In the illustrated embodiment, the frame 208 includes a first aperture 402 and the tang 106 includes a second aperture 404. The first aperture 402 and the second aperture 404 are shaped to receive the coupling member 238 to couple the tang 114 to the frame 208. As described in more detail further below, the first aperture 402 can be an anchor aperture that maintains the coupling member 238 in a fixed position relative to the frame 208, even when the buckle assembly 100 is subjected to a design-level load. As also described further below, the second aperture 404 can be a "load" aperture that provides for relative motion between the coupling member 238 and the frame 208 when the buckle assembly 100 is subjected to a design-level load. In several embodiments, the tang 114, the frame 208, the coupling member 238 and/or other components of the buckle assembly 100 can be made from a metal or a metal alloy. In other embodiments, these and/or other components can be made from composite materials, plastics, and/or other materials.

Figure 5:
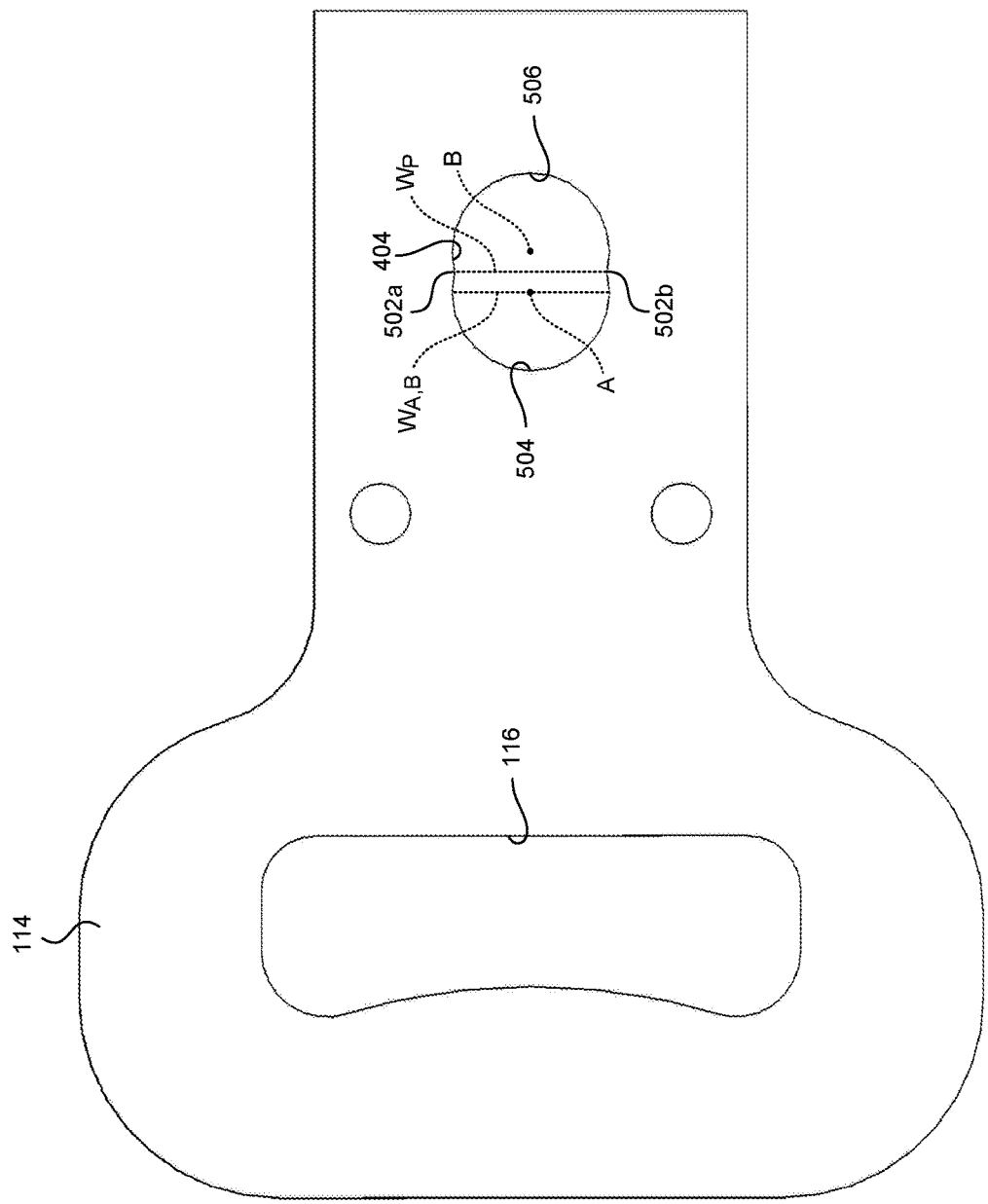
FIG. 5 is a top view of a buckle assembly tang configured in accordance with an embodiment of the present technology.

FIG. 5 is a top view of the tang 114 configured in accordance with an embodiment of the present technology. In the illustrated embodiment, the second aperture 404 is a non-circular opening (e.g., an elongated or slightly figure-8 shaped opening). More specifically, the tang 114 includes a pair of slight, inwardly facing protrusions 502 (identified individually as a first protrusion 502a and a second protrusion 502b) on opposing edges of the second aperture 404. The protrusions 502 at least partially define the second aperture 404, which includes a first end portion 504 and a second end portion 506. The second aperture 404 can be formed in a variety of manners. For example, the second aperture 404 can be formed by drilling or stamping the tang 404 with a drill bit or a circular stamp in two locations (identified as location A and location B) that are separated by a distance that is less than the diameter of the drill bit or stamp. In the illustrated embodiment, the width $W_{A,B}$ of the second aperture 404 at the locations A and B is slightly larger than the diameter of the central portion 242 of the coupling member 248. Accordingly, the central portion 242 of the coupling member 238 can extend through the first end portion 504 of the second aperture 404. Additionally, the second aperture 404 can be shaped such that a width $W_P$ at the protrusions 502 is less than the diameter of the central portion 242 of the coupling member 238. Accordingly, when the coupling member 238 extends through the first end portion 504 of the second aperture 404, the protrusions 502 can prevent the coupling member 238 from moving to the second end portion 506.

Referring to FIGS. 3-5 together, the tang 114 can be operably coupled to the frame 208 by extending the coupling member 238 through the first aperture 402 and the second aperture 404. In particular, prior to forming the swedged second head portion 244, the coupling member 238 can be inserted through the first aperture 402 with the second head portion 240 adjacent an underside of the frame 208. The tang 114 can then be positioned over the coupling member 238 such that the central portion 242 extends upwardly through the first end portion 504 of the second aperture 404. The second head portion 244 can then be formed via e.g., swedging to secure the tang 114 to the frame 208. Formation of the second head portion 244 secures the coupling member 238 within the first aperture 402 and within the first end portion 504 of the second aperture 404. In several embodiments, the tang 114 and the frame 208 can be aligned, and the coupling member 238 can be a rivet that is shot through the first aperture 402 and the first end portion 504 of the second aperture 404.

Figure 6:
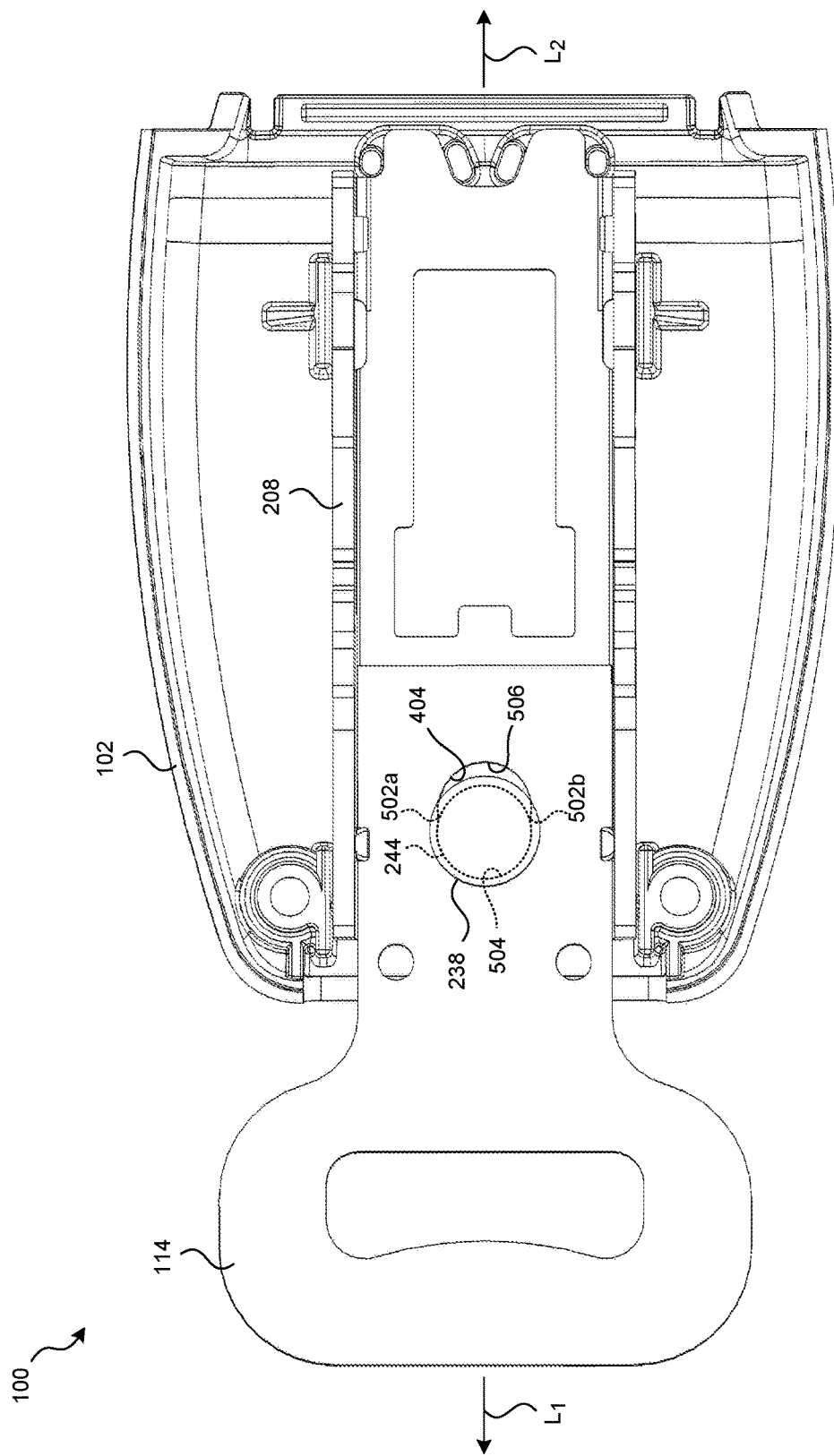
FIGS. 6 and 7 are top views of several components of a buckle assembly, and illustrate operation of a load indicating feature configured in accordance with an embodiment of the present technology.
Figure 7:
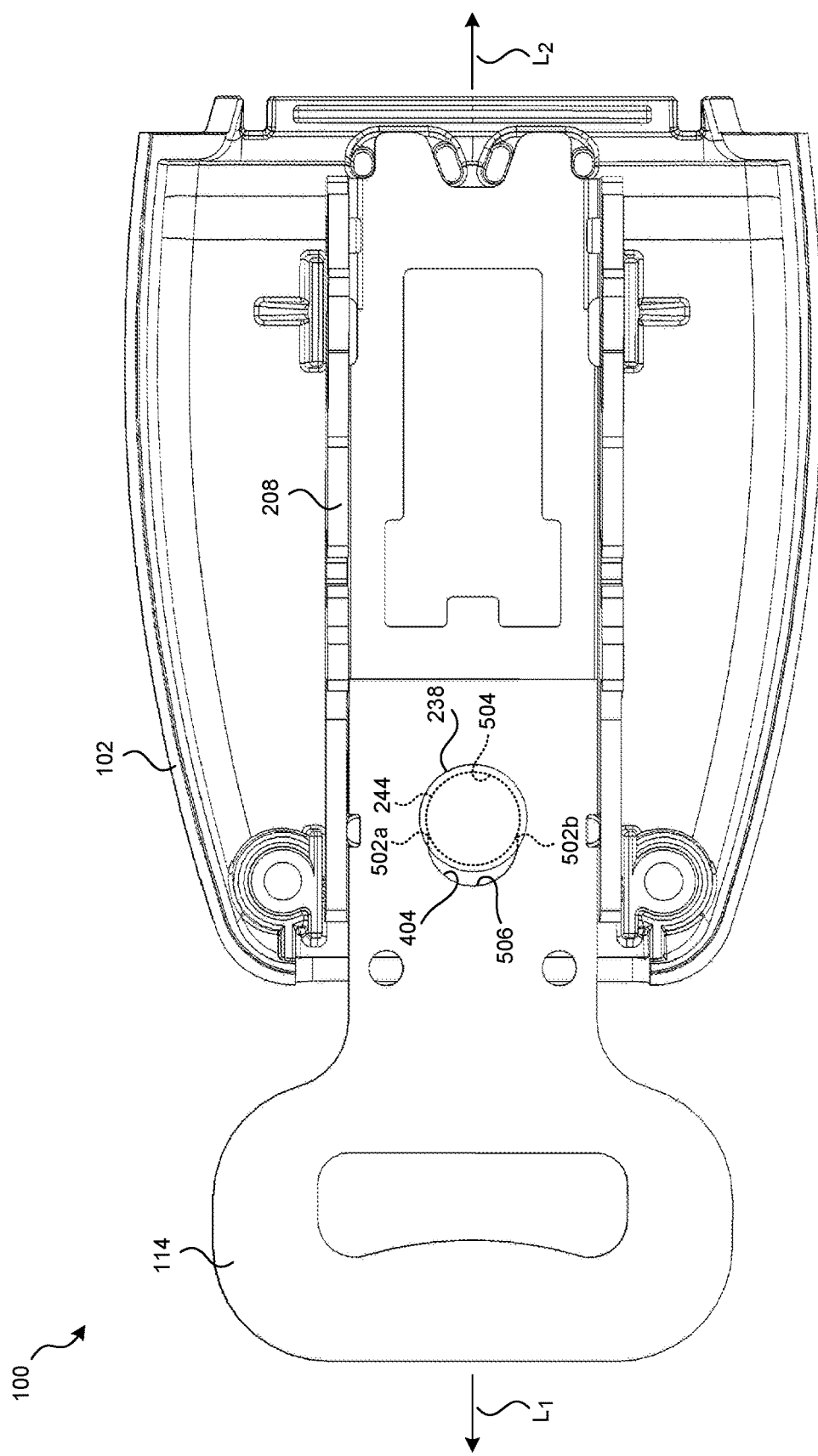

FIGS. 6 and 7 are top views of the buckle assembly 100 illustrating operation of the load indicating feature in accordance with an embodiment of the present technology. FIG. 6 depicts the buckle assembly 100 prior to exposure to a design-level load, and FIG. 7 depicts the buckle assembly 100 subsequent to exposure to a design-level load. Some of the components of the buckle assembly 100 have been omitted from FIGS. 6 and 7 for purposes of clarity. Referring to FIGS. 6 and 7 together, application of a design-level load to the buckle assembly 100 results in relative movement between the tang 114 and the frame 208, moving these components away from one another (as shown by arrows $L_1$ and $L_2$) and from a first position to a second position. Specifically, when loads in the directions of $L_1$ and $L_2$ are applied to the buckle assembly 100 (via the tang 114 and the frame 208), the protrusions 502 provide the only obstructions initially preventing the coupling member 238 from moving from the first end portion 504 of the second aperture 404 to the second end portion 506. If the load is equal to or greater than a design-level load, then the tension forces acting in opposite directions on the tang 114 and the frame 208 cause the coupling member 238 to deform the protrusions 502, and force them outwardly. The tang 114 and the frame 208 then pull away from one another in the direction of $L_1$ and $L_2$, moving from the first position in which the coupling member 238 is positioned in the first end portion 504 of the second aperture 404 (as shown in FIG. 6), to the second position in which the coupling member 238 is positioned in the second end portion 506 (as shown in FIG. 7).

FIGS. 8A to 9B are isometric and side views of several components of the buckle assembly 100 configured in accordance with an embodiment of the present technology. In particular, FIGS. 8A and 8B are isometric and side views, respectively, illustrating several components of the buckle assembly 100 prior to being subjected to a design-level load, and FIGS. 9A and 9B are isometric and side views, respectively, illustrating these same components after being subjected to a design-level load.

Referring to FIGS. 1, 6, 8A and 8B together, prior to application of a design-level load, the tang 114 is in the first position with respect to the frame 208. In the first position, the coupling member 238 extends through the first end portion 504 of the second aperture 404, the load indicating region 250 is not adjacent the window 104 (FIG. 1), and the contact feature 224 of the pawl extension 222 engages the switch actuator 254. Referring to FIGS. 1, 7, 9A and 9B together, after application of a design-level load to the buckle assembly 100, the tang 114 and the frame 208 move away from one another, and the coupling member 238 moves from the first end portion 504 of the second aperture 404 to the second portion 506, as described above. As shown in FIGS. 9A and 9B, after the application of the design level load and the associated movement of the tang 114 relative to the frame 208, the load indicating region 250 has translated in the direction of $L_1$ with respect to the frame 208, and the contact feature 224 is spaced apart from the switch actuator 254. Additionally, the load indicating region 250 is adjacent the window 104 (FIG. 1), and the color of the load indicating region 250 (e.g., bright red) is visible through the window 104. Accordingly, application of the design-level load changes the color visible through the window 104 from the first color (e.g., grey) to the second color (e.g., bright red). The change of color provides an indication to a user of the associated restraint system that the restraint system has been subjected to a design-level load, and that components need to be repaired or replaced.

In some embodiments, the switch 252 can provide an additional notification to a user of the restraint system that the system has sustained a design-level load. For example, in one embodiment, depressing the switch actuator 254 deactivates a seatbelt warning system that includes, e.g., one or more lights that illuminate and/or a buzzer that sounds when the associated vehicle is running and the connector 110 is not inserted in the buckle assembly 100. In normal operations, insertion of the connector 110 into the buckle assembly 100 causes the contact feature 224 to depress the actuator 254 and deactivate the seatbelt warning system. Application of a design-level load, however, moves the tang 114 relative to the frame 208, thereby moving the switch actuator 254 and the contact feature 224 away from one another and preventing deactivation of the seatbelt warning system. Specifically, prior to the application of a design-level load to the buckle assembly 100, the tang 114 is in the first position with respect to the frame 208 (FIGS. 8A and 8B). In the first position, insertion of the connector 110 into the buckle assembly 100 causes the contact feature 224 to engage the actuator 254. After the application of a design-level load, the tang 114 is in the second position with respect to the frame 208 (FIGS. 9A and 9B). In the second position, insertion of the connector 110 into the buckle assembly 100 does not actuate the switch 252 because the contact feature 224 is spaced apart from the actuator 254 and cannot reach the actuator 254. Accordingly, after a design-level load, insertion of the connector 110 into the buckle assembly 100 will not deactivate the seatbelt warning system. This provides another indication to a user of the restraint system that components need to be repaired or replaced.

Embodiments configured in accordance with the present technology can absorb and dissipate energy generated during crashes, thereby improving user safety. For example, the deformation of the protrusions 502 absorbs energy during a crash event and thereby reduces the forces exerted on the vehicle occupant.

Several embodiments configured in accordance with the present technology can be designed to quickly and easily replace an existing buckle assembly in a vehicle. For example, the buckle assembly 100 can include electrical connectors or leads that can match existing connectors in a vehicle, and the switch 252 can provide indications in a manner that is at least generally similar to a switch in an existing restraint system. Accordingly, in vehicles having seatbelt warning systems, the buckle assembly 100 can be retrofitted to replace an existing buckle assembly and provide the same indications of a buckled seatbelt as the prior buckle assembly. However, in the event of a design-level load, the buckle assembly 100 will not provide a signal when the seatbelt is buckled. Hence, the buckle assembly 100 can provide enhanced features to an existing vehicle by providing a warning via the vehicle's existing electrical system.

In several embodiments, the present technology can provide additional safety features. For example, several vehicle types (including some RUVs) have a "limp-home" feature that is activated by a computer system based on sensor data or other electronic inputs. The limp-home mode often limits the vehicle to a relatively low speed and may be activated due to an adverse engine condition (e.g., overheating) or some other malfunction or adverse condition. In several embodiments, the buckle assemblies disclosed herein can be added to an existing vehicle and integrated with the limp-home mode. For example, the switch 252 can be connected to the vehicles electrical system and can activate the limp-home mode when the switch 252 is not actuated via the actuator 254. This can enhance the safety of the associated vehicle by limiting the speed after a design-level load has been sustained until components of the restraint system have been repaired or replaced.

The shape of the second aperture 404 and the material type and thickness of the tang 114 can be configured to provide for deformation of the protrusions 502 at any of a variety of design-level loads. For example, increasing the thickness of the tang 114, increasing the prominence of the protrusions 502, or increasing the strength of the material for the tang 114 can provide a corresponding increase in the design-level load at which the buckle assembly 100 provides an indication. These features can be selected and modified to match or correspond to a calculated design-level load. In one example, if a component of the restraint system suffers failure at a load of X, the buckle assembly 100 can be designed to provide an indication of a design-level load at 50% of X. In such a system, the design-level load includes a safety factor that sets the indication substantially below the failure point of the component.

In several embodiments, the second aperture 404 can include alternative shapes or features. For example, rather than two protrusions 502, a single protrusion 502 can be employed. In another example, the second aperture 404 can include two openings separated by a portion of the tang 114 that extends therebetween. In one such embodiment, the second aperture 404 includes two circular openings that each have a diameter slightly larger than the central portion 242 of the coupling member 238. The two circular openings can be drilled or stamped with a small separation between each of the openings. Similar to embodiments described above, the coupling member 238 can be positioned to extend through one of the openings. Application of a design-level load to the associated buckle assembly causes the coupling member to break or deform the portion of the tang 114 between the two openings, thereby allowing the coupling member to move from one opening to the other. Additionally, although several embodiments described herein include an elongate second aperture or load aperture in the tang 114, in other embodiments, the tang 114 can include a round first aperture or anchor aperture, and an elongate second aperture or load aperture can be formed in the frame 208.

In other embodiments, other load absorbing features can be used to maintain the relative position of the tang 114 and the frame 208 during normal operations, but allow for movement and load indication upon the application of a design-level load. For example, load absorbing components or materials can be attached to the tang 114 or the frame 208. In one embodiment, a load absorbing component includes a honeycomb structure that is positioned to resist movement of the tang 114 away from the frame 208. Upon the application of a design-level load, the coupling member 238 and/or another component crushes the honeycomb structure, allowing for relative motion between the frame 208 and the tang 114. In some embodiments, a strain gauge can be included in a buckle assembly, or can be attached or integrated with a restraint system's webbing. Additionally, a buckle assembly or other restraint system component or assembly can include electronic components (e.g., sensors, circuitry, processors, memory, etc.) that can measure and record the value of loads applied to the associated restraint system.

Although several embodiments described herein include buckle assemblies having load indicating features, other embodiments can include other restraint system components that provide load indicating features. For example, D-rings, mounting brackets, and other restraint system components can include load indicating features, including apertures with deformable protrusions.

Several embodiments can include alternative or additional features that can be used to provide an indication or enhance an indication. For example, in one embodiment a convex lens can be added to the window 104 to increase the visibility of the load indicating region 250. In another embodiment, a light (e.g., a light-emitting diode) can be positioned within the buckle assembly 100. Upon the application of a design-level load, movement of the frame 208, the tang 114, or other components can activate the light (e.g., via the switch 252 or via another switch or component) to provide a steady or flashing illumination. In some of these embodiments, the housing 102 or another component can include a window, a light tunnel, or another opening or feature for light emission. For example, in one embodiment, the release button 228 or a portion of the release button 228 can be translucent and a light positioned within the housing 102 can illuminate the release button 228.

The buckle assemblies disclosed herein can also include audio indicators that activate upon the application of a design-level load. For example, the switch 252 or another switch or component can be coupled to an electrical circuit that includes a speaker. The speaker can be positioned in the buckle assembly 100 or in an alternative location within the vehicle. Upon the application of a design-level load, movement of the frame 208, the tang 114, or other components can activate the speaker to provide an audio indication to an occupant of the associated vehicle.

Several buckle assemblies disclosed herein can include pop-up indicators that are activated upon the application of a design-level load. For example, a spring loaded indicator can be retained within a housing via a clip or a frangible component. The clip or frangible component can be positioned to be removed or sheared upon relative motion between the tang 114 and the frame 208. The removal of the clip or frangible portion can release the pop-up indicator, which can extend out of an opening in the housing 102.

Additionally, several embodiments configured in accordance with the present technology can include components that can prevent the insertion of a connector into the buckle assembly after the buckle assembly has been subjected to a design-level load. For example, in one embodiment, a spring actuated blocking mechanism can be activated by movement of the tang 114 relative to the frame 208. Upon subsequent removal of the connector 110 from the buckle assembly 100, the spring actuated blocking mechanism can move to block the opening 106 in the housing 102 and prevent reinsertion of the connector 110. In another embodiment, the buckle assembly 100 can include a solenoid that can be activated by a switch that is actuated when a design-level load is sustained. The solenoid can move a pin or other blocking mechanism that blocks the opening 106 when the connector 110 is removed.

From the foregoing, it will be appreciated that specific embodiments have been described herein for purposes of illustration, but that various modifications may be made without deviating from the spirit and scope of the present technology. Those skilled in the art will recognize that numerous modifications or alterations can be made to the components or systems disclosed herein. Moreover, certain aspects of the present technology described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the present technology. Accordingly, the inventions are not limited except as by the appended claims.

We claim:

1. A buckle assembly, comprising:
   a frame having a first aperture;
   a tang having a second aperture, wherein the second aperture includes a first edge portion opposite a second edge portion, wherein the tang includes an inwardly facing protrusion on at least one of the first edge portion or the second edge portion of the second aperture, wherein the inwardly facing protrusion at least partially defines a first end portion of the second aperture and a second end portion of the second aperture; and
   a coupling member operably coupling the tang to the frame, wherein the coupling member extends through the first aperture in the frame and through the first end portion of the second aperture in the tang.

2. The buckle assembly of claim 1 wherein the tang is movable relative to the frame via deformation of the inwardly facing protrusion and associated movement of the coupling member from the first end portion of the second aperture to the second end portion of the second aperture, in response to a design-level load applied to the tang.

3. The buckle assembly of claim 2, further comprising an electrical switch mounted to the tang and operable to deactivate an occupant restraint system warning indicator when the coupling member extends through the first end portion of the second aperture.

4. The buckle assembly of claim 2, further comprising a visual load indicator coupled to the tang, wherein movement of the tang relative to the frame moves the visual load indicator from a first position to a second position to visually indicate the application of the design-level load on the buckle assembly.

5. The buckle assembly of claim 4, further comprising a housing having a window, wherein the visual load indicator includes a first portion having a first color and a second portion having a second color, and wherein the second portion is not visible through the window when the load indicator is in the first position, and the second portion is visible through the window when the load indicator is in the second position.

6. The buckle assembly of claim 1 wherein the second aperture comprises a figure eight shaped opening in the tang.

7. The buckle assembly of claim 1 wherein the second aperture is non-circular.

8. The buckle assembly of claim 1, further comprising:
   a switch operably coupled to the tang;
   a pawl pivotally mounted to the frame; and
   a pawl extension coupled to the pawl, wherein the pawl extension is operable to actuate the switch upon insertion of a web connector into the buckle assembly.

9. The buckle assembly of claim 1, further comprising a load indicator operable to provide an indication of the position of the coupling member within the second aperture.

10. A buckle assembly for releasably engaging a web connector, the buckle assembly comprising:
    a frame having a first aperture;

a pawl pivotally attached to the frame and having a latch positioned to releasably engage the web connector;

a tang having a second aperture that includes a first end portion and a second end portion, wherein the tang includes a first inwardly facing obstruction on a first edge portion of the second aperture and a second inwardly facing obstruction on a second opposing edge portion of the second aperture, wherein the first obstruction and the second obstruction are positioned between the first end portion and the second end portion; and a coupling member extending through the first aperture and the first end portion of the second aperture to secure the tang to the frame, wherein the obstructions are deformable under a design-level load to permit movement of the coupling member from the first end portion to the second end portion.

11. The buckle assembly of claim 10, further comprising a housing having a window, and a load indicator having a load indicating region, wherein movement of the coupling member from the first end portion of the second aperture to the second end portion includes movement of the load indicating region to a position adjacent to the window.

12. The buckle assembly of claim 10 wherein the second aperture includes a figure eight shape.

13. The buckle assembly of claim 10, further comprising an electrical switch positioned such that engagement of the web connector with the buckle assembly actuates the switch when the coupling member extends through the first end portion of the second aperture.

14. The buckle assembly of claim 13 wherein engagement of the web connector with the buckle assembly does not actuate the switch when the coupling member extends through the second end portion of the second aperture.

15. The buckle assembly of claim 13, further comprising a pawl extension coupled to the pawl, wherein the pawl extension is operable to actuate the switch via rotation of the pawl.

16. The buckle assembly of claim 10 wherein the design-level load is applied via forces acting on the tang and on the pawl.

17. A load indicating buckle assembly, comprising:

a frame having a first aperture;

a tang having a second aperture, wherein one of the first aperture and the second aperture is circular, and the other of the first aperture and the second aperture is elongated, and wherein inwardly facing protrusions on opposing edge portions of the elongated aperture at least partially define a first end portion and a second end portion of the elongated aperture; and a coupling member extending through the circular aperture and the first end portion of the elongated aperture to secure the tang to the frame, wherein the protrusions are deformable under a design-level load to permit movement of the coupling member from the first end portion to the second end portion.

18. The buckle assembly of claim 17, further comprising a pawl rotatably coupled to the frame, and a switch, wherein application of the design-level load includes movement of the switch from an actuable position to a non-actuable position.

19. The buckle assembly of claim 18, further comprising a pawl extension coupled to the pawl, wherein the pawl extension includes a contact feature positioned to engage the switch via rotation of the pawl.

20. The buckle assembly of claim 17, further comprising a load indicator having an indicating region, wherein application of the design-level load includes movement of the indicating region from a non-visible position to a visible position.

21. The buckle assembly of claim 17 wherein the coupling member includes a cylindrical central portion, and wherein the cylindrical central portion extends through the circular aperture and the elongated aperture.

* * * * *